(12) United States Patent
Nakashima et al.

(10) Patent No.: US 9,744,832 B2
(45) Date of Patent: Aug. 29, 2017

(54) ANTI-GLARE APPARATUS HAVING LIGHT EMITTED FROM INSIDE A MOVING VEHICLE TO A LIGHT REACTIVE MEMBER

(71) Applicant: TOYOTA JIDOSHA KABUSHIKI KAISHA, Toyota-shi, Aichi-ken (JP)

(72) Inventors: Kazuhiko Nakashima, Miyoshi (JP); Kazuya Asaoka, Seto (JP); Sho Masuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 171 days.

(21) Appl. No.: 14/918,040

(22) Filed: Oct. 20, 2015

(65) Prior Publication Data

US 2016/0159206 A1 Jun. 9, 2016

(30) Foreign Application Priority Data

Dec. 4, 2014 (JP) .................................. 2014-245640

(51) Int. Cl.
*B60J 3/04* (2006.01)
*G02B 27/00* (2006.01)
*G02B 26/02* (2006.01)

(52) U.S. Cl.
CPC ................ *B60J 3/04* (2013.01); *G02B 26/02* (2013.01); *G02B 27/0093* (2013.01); *Y02T 10/88* (2013.01)

(58) Field of Classification Search
CPC ....... B60K 2350/2078; B60Q 2300/056; B60J 3/04
USPC ................................................... 250/205, 221
See application file for complete search history.

(56) References Cited

U.S. PATENT DOCUMENTS

| | | | |
|---|---|---|---|
| 9,415,719 B2 * | 8/2016 | Hayakawa | B60Q 1/143 |
| 2010/0165099 A1 | 7/2010 | Marchthaler et al. | |

FOREIGN PATENT DOCUMENTS

| | | |
|---|---|---|
| JP | S59-142121 U | 9/1984 |
| JP | 2005-136561 A | 5/2005 |
| JP | 2005-335410 A | 12/2005 |
| JP | 2006-315892 A | 11/2006 |
| JP | 2008189253 A | 8/2008 |
| JP | 2009292474 A | 12/2009 |
| JP | 2010-184643 A | 8/2010 |
| JP | 2014008788 A | 1/2014 |
| JP | 2014133441 A | 7/2014 |

* cited by examiner

*Primary Examiner* — Que T Le
(74) *Attorney, Agent, or Firm* — Oliff PLC

(57) ABSTRACT

A light source detector detects, from a vehicle, a light source that exists outside the vehicle. A light reactive sheet is arranged in a planar form and is located in front of the driver driving the vehicle. The light reactive sheet changes color in response to light having a specific frequency. A light source position calculating unit calculates a light source position on the surface of the light reactive sheet based on output of the light source detector. A light emitter emits light having the specific frequency from the inside of the vehicle to the light reactive sheet based on the calculated light source position.

9 Claims, 4 Drawing Sheets

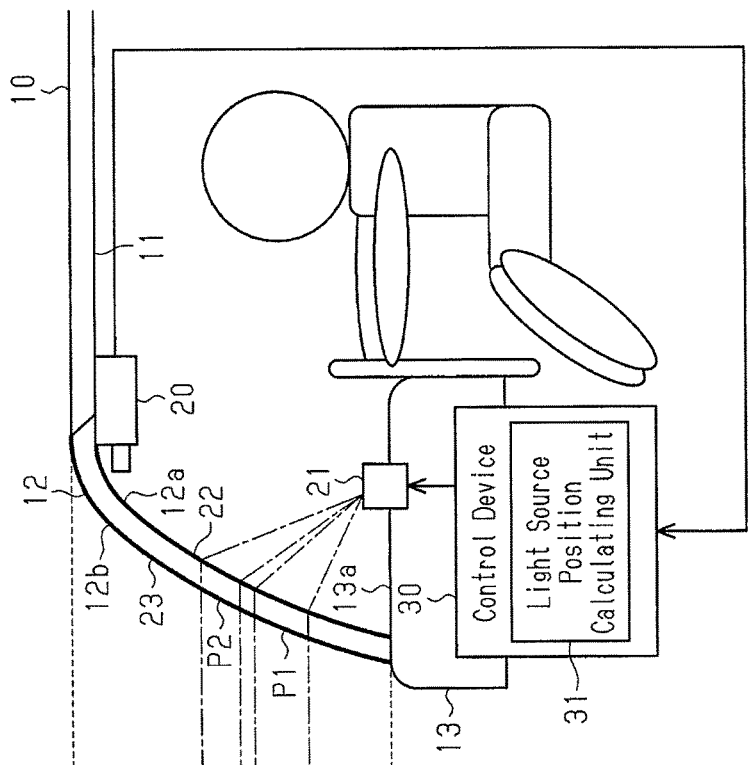
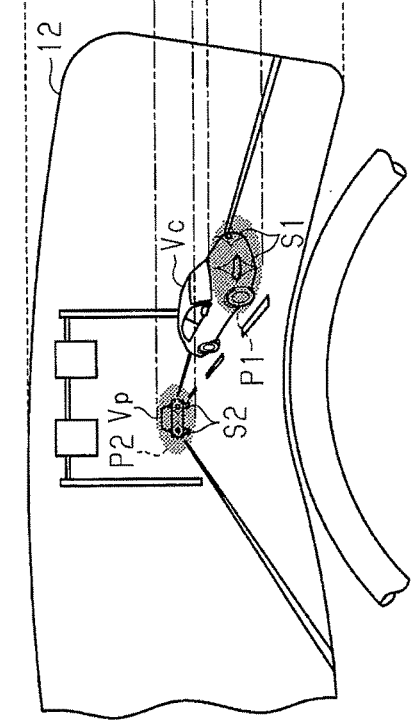

ANTI-GLARE APPARATUS HAVING LIGHT EMITTED FROM INSIDE A MOVING VEHICLE TO A LIGHT REACTIVE MEMBER

BACKGROUND OF THE INVENTION

The present disclosure relates to an anti-glare apparatus that reduces glare of light emitted from a light source that exists outside a moving vehicle such as an automobile, a ship, or an aircraft.

Conventionally, Japanese Laid-Open Patent Publication No. 2008-189253 discloses such an anti-glare apparatus. The apparatus disclosed in Japanese Laid-Open Patent Publication No. 2008-189253 uses a motor to move a sun visor mounted on a headlining board in a passenger compartment between a shading position, where the upper section of a windshield is covered from the inside of the passenger compartment, and a retracted position, where the upper section of the windshield is not covered based on information obtained by a front view camera. A front view image taken by the front view camera includes a previously set defined area corresponding to the driver's field of view. If a high-intensity pixel is in the defined area, a glare reducing control ECU determines that sunlight is incident on the windshield, and moves the sun visor to a position between the shading position and the retracted position, or to the shading position to provide a shading state that blocks incident light reaching the driver's eyes through the windshield.

In the apparatus disclosed in Japanese Laid-Open Patent Publication No. 2008-189253, if a high-intensity pixel having an intensity greater than or equal to a previously determined intensity (e.g., sunlight) exists in the defined area in the front view image, the apparatus determines that sunlight is incident on the windshield, and uses the sun visor to block only the sunlight that enters from forward and above. Due to this, when the vehicle travels at night or in a tunnel, for example, glare of light of headlights of oncoming vehicles or glare of light of tail lights of vehicles in front of the moving vehicle and moving in the same direction as the moving vehicle (i.e., preceding vehicles) that enter from the front of the moving vehicle is not effectively reduced.

Accordingly, it is an objective of the present disclosure to provide an anti-glare apparatus that effectively reduces glare of light that enters from the front of a moving vehicle.

SUMMARY

In accordance with one aspect of the present disclosure, an anti-glare apparatus is provided that includes a light source detector, a light reactive member, a control device, and a light emitter. A light source detector is configured to detect a light source that exists outside the moving vehicle. A light reactive member has a planar shape, and is located in front of a driver operating the moving vehicle. The light reactive member is configured to change color in response to light having a specific frequency. A light source position calculating unit, which is part of the control device, is configured to calculate a position of the light source on the surface of the light reactive member based on output of the light source detector. A light emitter is configured to emit light having the specific frequency from the inside of the moving vehicle to the light reactive member, based on the calculated light source position.

According to the above configuration, the light source position on the surface of the light reactive member arranged in front of the driver is calculated based on the output of the light source detector, and light having the specific frequency is emitted from the light emitter to the light reactive member based on the calculated position. Thus, the color of the irradiated part of the light reactive member, that is, the transmittance of light from the light source through the irradiated part, is changed. This effectively reduces glare of light that enters from the front of the moving vehicle and reduces dazzle (i.e., temporary blindness) experienced by the driver.

In the above described anti-glare apparatus, the light reactive member is preferably a light reactive sheet located on an inner surface of a windshield of the moving vehicle, which reacts to light having a specific frequency. According to this configuration, the light reactive sheet is located on the inner surface of the existing windshield of the moving vehicle by a method such as adhesion or printing to form the light reactive layer. In this manner, a highly practical light reactive member that utilizes the windshield is configured.

The above described anti-glare apparatus preferably includes a light shielding sheet located on an outer surface of the windshield. The light shielding sheet is preferably configured to block light having the specific frequency. The above configuration eliminates the inconvenience caused by, for example, light having the specific frequency that is emitted from the light emitter and leaks through the light reactive member to the outside of the moving vehicle, which can adversely affect areas surrounding the moving vehicle. If the light having the specific frequency is, for example, ultraviolet (UV) light, glare of the aforementioned sunlight is also expected to be reduced. If the light having the specific frequency is, in particular, the UV light, the moving vehicle that uses a windshield such as a UV reduction glass eliminates the inconvenience caused by the UV light emitted from the light emitter that leaks to the outside of the moving vehicle. That is, in this case, it is sufficient to include only the light reactive sheet on the inner surface of the windshield as in the former configuration.

The above described anti-glare apparatus preferably includes a face orientation detector configured to detect a face orientation of a driver operating the moving vehicle. The light source position calculating unit is preferably configured to calculate a driver's field of view from output of the face orientation detector, and the light source position calculating unit is preferably configured to determine that the light source position is a position of the light source located within the driver's field of view.

According to the above configuration, since the light source position calculated from the output of the face orientation detector is determined as the light source position on the surface of the light reactive member, glare of only the light that enters the driver's field of view is efficiently reduced among light rays that enter from the front of the moving vehicle.

The above described anti-glare apparatus also preferably includes a line-of-sight detector configured to detect a line of sight from the position of a pupil of an eye of a driver operating the moving vehicle. The light source position calculating unit is preferably configured to determine the light source position determine that the light source position to be calculated is a position of the light source located within the line of sight of the driver.

According to the above configuration, since the position including the driver's line of sight output from the line-of-sight detector is determined as the light source position on the surface of the light reactive member, glare of only the light in the driver's line of sight is efficiently reduced among light rays that enter from the front.

Other aspects and advantages of the invention will become apparent from the following description, taken in conjunction with the accompanying drawings, illustrating by way of example the principles of the invention.

BRIEF DESCRIPTION OF THE DRAWINGS

The preferred embodiments, together with objects and advantages thereof, may best be understood by reference to the following description together with the accompanying drawings in which:

FIG. 1A is a diagram showing a state in which an anti-glare apparatus according to a first embodiment shown in FIG. 1B has emitted light having a specific frequency into the surface of the windshield of a vehicle;

FIG. 1B is a side block diagram illustrating a schematic configuration of the anti-glare apparatus shown in FIG. 1A installed in the vehicle;

DESCRIPTION OF THE PREFERRED EMBODIMENTS

Figure 2:
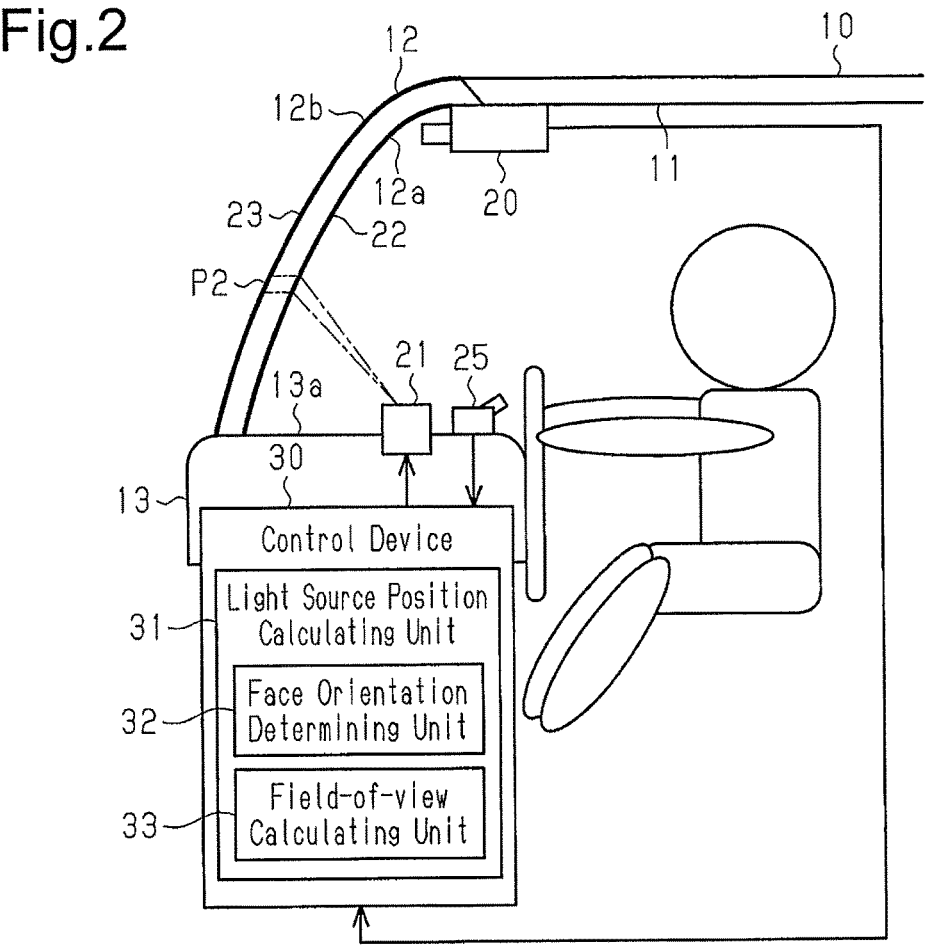
FIG. 2 is a side block diagram illustrating a schematic configuration of an anti-glare apparatus according to a second embodiment installed in a vehicle.

FIGS. 1A and 1B show an anti-glare apparatus according to a first embodiment. The anti-glare apparatus of the present embodiment is installed in a moving vehicle, which is a vehicle 10 in this embodiment, and reduces glare of light that is emitted from a light source existing outside the vehicle 10.

As shown in FIG. 1B, the vehicle 10 has a ceiling 11 to which a light source detector 20 is secured. The light source detector 20 detects a light source existing outside the vehicle 10. The light source detector 20 is a camera that detects a light source existing in front of the vehicle 10 from a front view image from the vehicle 10 and outputs the detected result as needed. The light source detector 20 detects, as the light source, light of which the intensity is greater than or equal to a predetermined intensity that dazzles (i.e., temporarily blinds) a driver. The light source detector 20 outputs information about the light source position ahead of the vehicle 10 to a control device 30 as a detection result. The control device 30 includes a CPU, a RAM, and a ROM. The control device 30 is composed of circuitry.

The vehicle 10 includes a windshield 12 located in front of the driver's seat. The windshield 12 has an inner surface 12a, on which a light reactive sheet 22 is provided. In response to light having a specific frequency, the light reactive sheet 22 varies the color (and thus, the transmittance of light) from a light source. The light reactive sheet 22 develops color, or varies the light transmittance, when exposed to light having a specific frequency, and loses color instantaneously, or resets the light transmittance, when no longer exposed to light. The light reactive sheet 22 is adhered to the inner surface 12a of the windshield 12, for example, with an adhesive. The light reactive sheet 22 is transparent in normal condition.

The windshield 12 has an outer surface 12b, on which a light shielding sheet 23 is provided. The light shielding sheet 23 blocks light having a specific frequency. The light shielding sheet 23 absorbs light having a specific frequency to prevent the light having the specific frequency from passing through, thereby blocking the light. The light shielding sheet 23 is also adhered to the outer surface 12b of the windshield 12, for example, with an adhesive.

A dashboard 13 has an upper section 13a, on which a light emitter 21 is mounted. The light emitter 21 emits light having the specific frequency to the light reactive sheet 22 from the inside of the vehicle 10. The light emitter 21 emits light having the specific frequency onto a certain range or at multiple positions in various forms corresponding to the size of the light source. See, for example, FIG. 1A.

The control device 30 of the vehicle 10 may include a light source position calculating unit 31, which calculates the light source position on the surface of the light reactive sheet 22 based on the output from the light source detector 20 as needed. The control device 30 also controls the manner in which the light emitter 21 emits light. The light source position calculating unit 31 calculates the light source position on the surface of the light reactive sheet 22 based on the detection result of the light source detector 20, and outputs the calculated position information to the light emitter 21. Thus, the light emitter 21 emits light having the specific frequency from the inside of the vehicle 10 in accordance with the obtained light source position on the surface of the light reactive sheet 22.

Material that changes color in response to light having a specific frequency includes photochromic compounds that exhibit a phenomenon in which the color of a substance is reversibly changed upon exposure to light, which is known as photochromism. The light reactive sheet 22 is formed into a sheet by, for example, dispersing photochromic compounds in polymers. The specific frequency light may be, for example, ultraviolet (UV) light.

Operation of the thus configured anti-glare apparatus will now be described.

As shown in Fig. 1A, assume that an oncoming vehicle Vc is approaching ahead of the vehicle 10 and a preceding vehicle Vp is travelling further down a road (but in an opposite direction) of the oncoming vehicle Vc. That is, the light sources existing ahead of the vehicle 10 in this state are: (1) the headlights of the oncoming vehicle Vc; and (2) the tail lights of the preceding vehicle Vp. Assume that the headlights of the oncoming vehicle Vc are first light sources S1, and the tail lights of the leading vehicle Vp are second light sources S2. In this example scenario, the light source detector 20 detects the light sources S1, S2 existing outside the vehicle 10, and outputs the detection result to the control device 30 of the anti-glare apparatus. That is, the light source detector 20 detects that the first light sources S1 are located at a position close to the vehicle 10 that is ahead of and on the right of the vehicle 10, and that the second light sources S2 are located at a position ahead of and far from the vehicle 10.

At this point, as shown in FIG. 1B, the light source position calculating unit 31 of the control device 30 calculates, as light source positions P1, P2, the positions on the surface of the light reactive sheet 22 where the light sources S1, S2 ahead of the vehicle 10 pass when entering from the outside to the inside of the vehicle 10 based on the detection result received from the light source detector 20. The first light source position P1 is the position at which the first light sources Si enter the surface of the light reactive sheet 22. The second light source position P2 is the position at which the second light sources S2 enter the surface of the light reactive sheet 22.

The light source position calculating unit 31 outputs the calculated light source positions P1, P2 to the light emitter 21. The light emitter 21 emits light having the specific frequency to the light source positions P1, P2 on the inner surface of the light reactive sheet 22. Thus, the irradiated positions on the surface of the light reactive sheet 22 that are exposed to light correspond to the positions of the light source positions. Such emission of light having the specific frequency by the light emitter 21 is executed only when the light sources S1, S2 exist ahead of the vehicle 10. When the positions of the light sources 51, S2 relative to the vehicle 10 change, the positions detected by the light source detector 20 are also changed. Subsequently, the light source positions P1, P2 calculated by the light source position calculating unit 31 are also changed. When the positions of light having the specific frequency emitted from the light emitter 21 are changed in accordance with changes in the light source positions P1, P2, the irradiated areas of the light reactive sheet 22 develop color. In this manner, since parts of the light reactive sheet 22 that have developed color have less light transmittance, a glare of the light that enters from the front of the vehicle 10 is reduced.

Some of the light having the specific frequency emitted from the light emitter 21 is not absorbed by the light reactive sheet 22, and passes through the windshield 12. Since such light is absorbed by the light shielding sheet 23, the emitted light having the specific frequency is prevented from going outside the vehicle 10.

The present embodiment has the following advantages.

(1) The light source position on the surface of the light reactive sheet 22 arranged in front of the driver is calculated based on the output of the light source detector 20, and the light emitter 21 emits light having the specific frequency to the light reactive sheet 22 based on the calculated position. Thus, the color of the irradiated parts of the light reactive sheet 22 (i.e., the transmittance of the light from the light source) is changed. This effectively reduces glare of light that enters from the front of the vehicle 10 and reduces dazzle experienced by the driver.

(2) The light reactive sheet 22 is arranged on the inner surface 12a of the windshield 12 of the vehicle 10 to form a light reactive layer. Thus, a highly practical light reactive member is configured by utilizing the windshield 12.

(3) The light shielding sheet 23 is arranged on the outer surface 12b of the windshield 12 of the vehicle 10. Thus, light having the specific frequency emitted from the light emitter 21 is inhibited from leaking outside the vehicle 10 through the light reactive sheet 22. This eliminates inconvenience such as adverse influence on the surroundings.

In the first embodiment, the shape of the light having the specific frequency emitted from the light emitter 21 to the light reactive sheet 22 does not necessarily have to be a spotlight-like shape shown in FIGS. 1A and 1B, but may be a band-like shape including the light source positions P1, P2.

An anti-glare apparatus according to a second embodiment will now be described with reference to FIGS. 2 and 3. The anti-glare apparatus of the present embodiment includes a face orientation detector 25, which detects the orientation of the driver's face, and differs from the first embodiment in that a light source position is determined considering the driver's field of view from the output of the face orientation detector 25. Differences from the first embodiment will mainly be discussed below.

As shown in FIG. 2, the face orientation detector 25, which detects the driver's face orientation, is mounted on the upper section 13a of the dashboard 13. The face orientation detector 25 is a camera that detects the positions of the eyes, nose, and mouth from the image of the driver's face and outputs the detection result to the control device 30 as needed.

The light source position calculating unit 31 of the control device 30 also calculates the driver's field of view from the output of the face orientation detector 25, and determines the light source position on the surface of the light reactive sheet 22 to be a position of the light source that is located within the driver's field of view.

The light source position calculating unit 31, which is part of the control device 30, includes a face orientation determining unit 32, which determines the driver's face orientation from the output of the face orientation detector 25, and a field-of-view calculating unit 33, which calculates the driver's field of view based on the determination result of the face orientation determining unit 32. The face orientation determining unit 32 determines the displacement of the driver's face orientation based upon a reference position in the horizontal and vertical directions. On the basis of the determination result of the driver's face orientation obtained by the face orientation determining unit 32, the field-of-view calculating unit 33 calculates the driver's field of view by shifting the field of view when the driver's face orientation is at the reference position in accordance with the determined face displacement amount. Among the light source positions calculated based on the output of the light source detector 20, the light source position calculating unit 31 determines the light source positions that are included in the driver's field of view calculated by the field-of-view calculating unit 33 as the light source positions on the surface of the light reactive sheet 22. That is, the anti-glare apparatus of the present embodiment reduces glare of only the light sources included in the driver's field of view if there are light rays that enter the surface of the light reactive sheet 22 from the light sources outside the vehicle 10.

Operation of the thus configured anti-glare apparatus will now be described.

Figure 3:
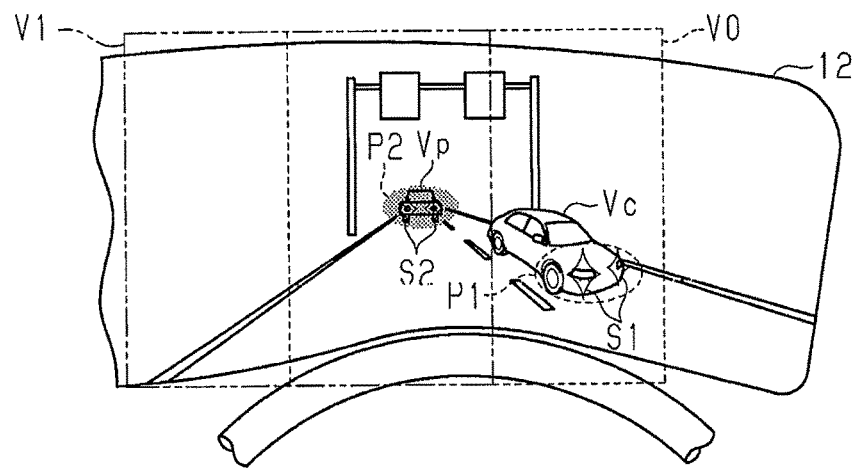
FIG. 3 is a diagram showing a state in which the anti-glare apparatus shown in FIG. 2 has emitted light having a specific frequency into the surface of the windshield of a vehicle and an example of a driver's field of view.

FIG. 3 shows an example of a sight that the driver may see via the windshield 12 when the oncoming vehicle Vc is approaching ahead of the vehicle 10 and the preceding vehicle Vp is travelling further ahead (but in an opposite direction) of the oncoming vehicle Vc. Thus, the light sources that exist ahead of the vehicle 10 are the headlights of the oncoming vehicle Vc, that is, the first light sources S1, and the tail lights of the preceding vehicle Vp, that is, the second light sources S2. A reference field of view V0 when the driver faces forward during normal driving is shown by a broken line. An example of a field of view when the driver changes the orientation of the face leftward is shown by a long dashed double-short dashed line (V1). In this example scenario, the light source detector 20 detects the light sources S1, S2 located outside the vehicle 10 and outputs the detection result to the control device 30. The face orientation detector 25 detects the driver's face orientation and outputs the detection result to the control device 30. Note that the face orientation determining unit 32 determines that the driver's face orientation is displaced leftward from the reference position. On the basis of the determination result that the driver's face orientation is displaced leftward obtained by the face orientation determining unit 32, the field-of-view calculating unit 33 calculates that the position of the driver's field of view is at the leftward field of view V1. The light source position calculating unit 31 determines, among the light source positions P1, P2 calculated in accordance with the output of the light source detector 20, the second light source position P2 included in the driver's leftward field of view V1 calculated by the field-of-view calculating unit 33 as the light source position on the surface of the light reactive sheet 22. At this time, as shown in FIG. 2, the light source position calculating unit 31 outputs the calculated light source position P2 to the light emitter 21. Thus, the light emitter 21 emits light having the specific frequency to the light source position P2 on the inner surface 12a of the light reactive sheet 22. Such emission of light having the specific frequency is performed only when the light source S2 exists in the leftward field of view V1. Since the light that enters the windshield 12 from the headlights of the oncoming vehicle Vc is not in the driver's leftward field of view V1, the driver is not dazzled. Thus, glare of only the light that enters the driver's field of view is reduced.

The present embodiment has the following advantages in addition to the advantages (1) to (3) of the first embodiment.

(4) Since the position including the driver's field of view V1 calculated from the output of the face orientation detector 25 is determined as the light source position on the surface of the light reactive sheet 22, glare of only the light that enters the driver's field of view V1 is efficiently reduced among the light rays that enter from the front.

An anti-glare apparatus according to a third embodiment will now be described with reference to FIGS. 4 and 5. The anti-glare apparatus of the present embodiment includes a line-of-sight detector 26, which detects the line of sight from the position of the driver's pupils, and differs from the first embodiment in that the light source position is determined considering the line of sight of the driver based on the output of the line-of-sight detector 26 and the output of the light source detector 20. Differences from the first embodiment will mainly be discussed below.

Figure 4:
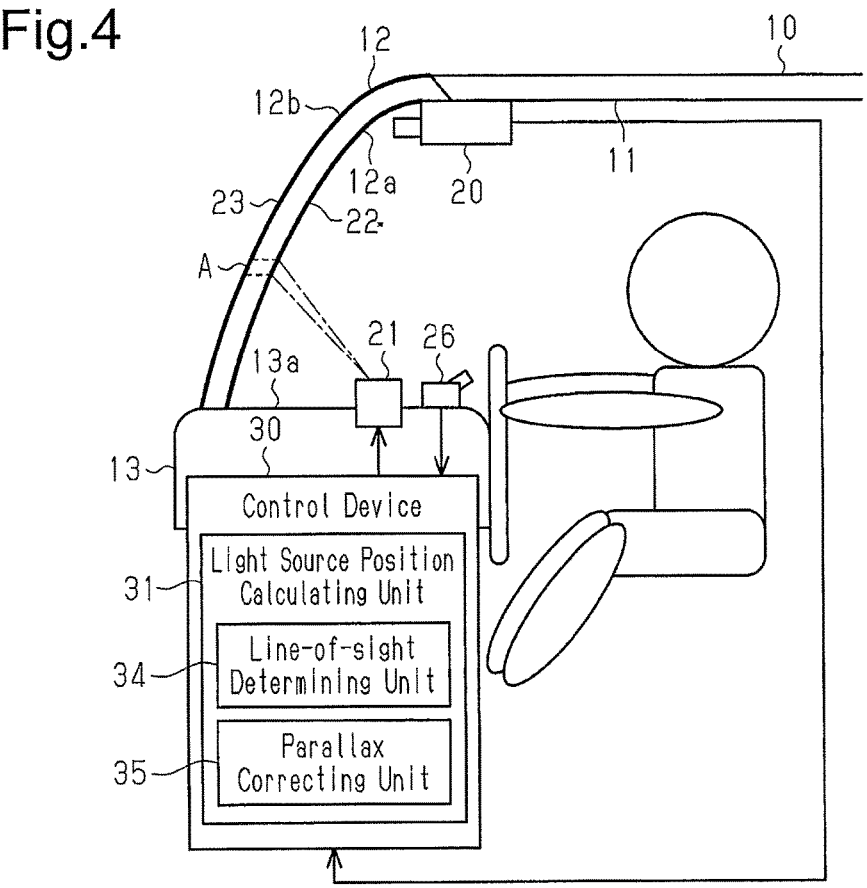
FIG. 4 is a side block diagram illustrating a schematic configuration of an anti-glare apparatus according to a third embodiment installed in a vehicle.

As shown in FIG. 4, the line-of-sight detector 26, which detects the line of sight from the position of the driver's pupils, is mounted on the upper section 13a of the dashboard 13. The line-of-sight detector 26 is a camera that detects the line of sight from the image of the driver's eyes and outputs the detection result to the control device 30 as needed. The line of sight detected by the line-of-sight detector 26 is a line-of-sight direction presumed from the position of the pupils. The light source position calculating unit 31 of the control device 30 determines, based on the output of the line-of-sight detector 26 and the output of the light source detector 20, the light source position to be calculated by the light source position calculating unit 31 as the position including the driver's line of sight.

The light source position calculating unit 31 of the control device 30 includes a line-of-sight determining unit 34, which determines the driver's line of sight from the output of the line-of-sight detector 26 and the output of the light source detector 20, and a parallax correcting unit 35, which calculates the intersection of the driver's line of sight and the windshield 12 based on the determination result of the line-of-sight determining unit 34. The line-of-sight determining unit 34 calculates the driver's line of sight that connects the driver's pupils and the light source and determines the position of the line of sight. The parallax correcting unit 35 calculates the intersection of the driver's line of sight and the inner surface 12a of the windshield 12 based on the position of the driver's line of sight obtained by the line-of-sight determining unit 34.

In this manner, the light source position calculating unit 31 determines the light source position to be calculated as the position including the intersection of the driver's line of sight calculated by the parallax correcting unit 35 and the inner surface 12a of the windshield 12. That is, the anti-glare apparatus of the present embodiment reduces glare of only the light source included in the driver's line of sight if light rays enter the surface of the light reactive sheet 22 from light sources outside the vehicle 10.

Operation of the thus configured anti-glare apparatus will now be described.

Figure 5:
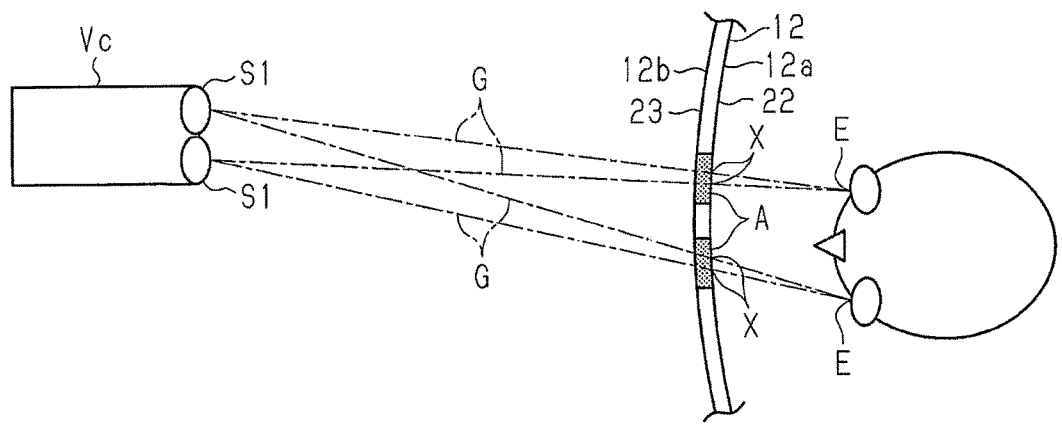
FIG. 5 is a schematic plan view of an example of the position of a light source calculated by the anti-glare apparatus shown in FIG. 4 and a driver's line of sight.

FIG. 5 schematically shows, from above, the state of the vehicle 10 and the oncoming vehicle Vc when the oncoming vehicle Vc is approaching ahead of the vehicle 10. In this state, the light sources that exist ahead of the vehicle 10 are the headlights of the oncoming vehicle Vc, that is, the first light sources S1. FIG. 5 shows driver's lines of sight G, which connect the driver's left and right pupils E and the left and right headlights of the oncoming vehicle Vc, that is, the first light sources S1 in long dashed short dashed lines. At this time, the light source detector 20 detects the light sources S1 existing outside the vehicle 10 and outputs the detection result to the control device 30. The line-of-sight detector 26 detects the driver's lines of sight G and outputs the detection result to the control device 30. Thus, the line-of-sight determining unit 34 determines the position of the driver's lines of sight G, which connect the driver's pupils E and the first light sources S1, based on the output of the light source detector 20 and the output of the line-of-sight detector 26. The parallax correcting unit 35 calculates intersections X of the lines of sight G and the inner surface 12a of the windshield 12 based on the positions of the driver's lines of sight G determined by the line-of-sight determining unit 34.

Thus, as shown in FIG. 4, the light source position calculating unit 31 outputs positions A that include the intersections X of the lines of sight G and the inner surface 12a of the windshield 12 to the light emitter 21 as the light source positions. The light emitter 21 emits light having the specific frequency to the positions A on the inner surface 12a of the light reactive sheet 22. The emission of light having the specific frequency in this case is also performed only when the light sources Si are present. In this manner, the present embodiment reduces glare of only the light that enters the driver's line of sight.

The present embodiment has the following advantages in addition to the advantages (1) to (3) of the first embodiment.

(5) Since the positions A that include the driver's lines of sight G output from the line-of-sight detector 26 are determined to be the light source positions on the surface of the light reactive sheet 22, among light rays that enter from the front, glare of only the light in the driver's lines of sight G is expected to be more efficiently reduced.

The above described embodiments may be modified as follows.

Figure 6:
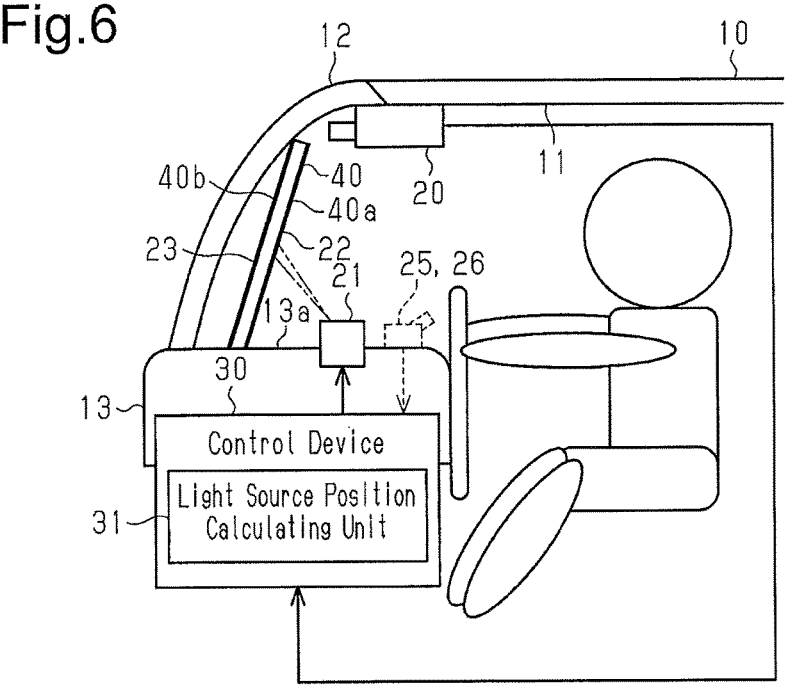
FIG. 6 is a side view showing the arrangement of a light reactive member according to a modification.

In each of the above embodiments, the light reactive sheet 22 is provided on the inner surface 12a of the windshield 12 as the light reactive member. However, a transparent plate apart from the windshield 12 may be mounted in front of the driver, and a light reactive sheet may be provided on the inner surface of this plate. For example, as shown in FIG. 6, a transparent plate 40 is vertically arranged inward of the windshield 12 and on the upper section of the dashboard 13. The light reactive sheet 22 is provided on an inner surface 40a of the transparent plate 40 and the light shielding sheet 23 is provided on an outer surface 40b of the transparent plate 40. Light having the specific frequency is emitted from the light emitter 21 onto the light source position calculated as a position on the surface of the transparent plate 40 to reduce glare of light as described above. In this case, the transparent plate 40 itself may be the light reactive member. In this case also, the outer surface 40b of the transparent plate 40 preferably has the light shielding sheet 23.

Figure 7:
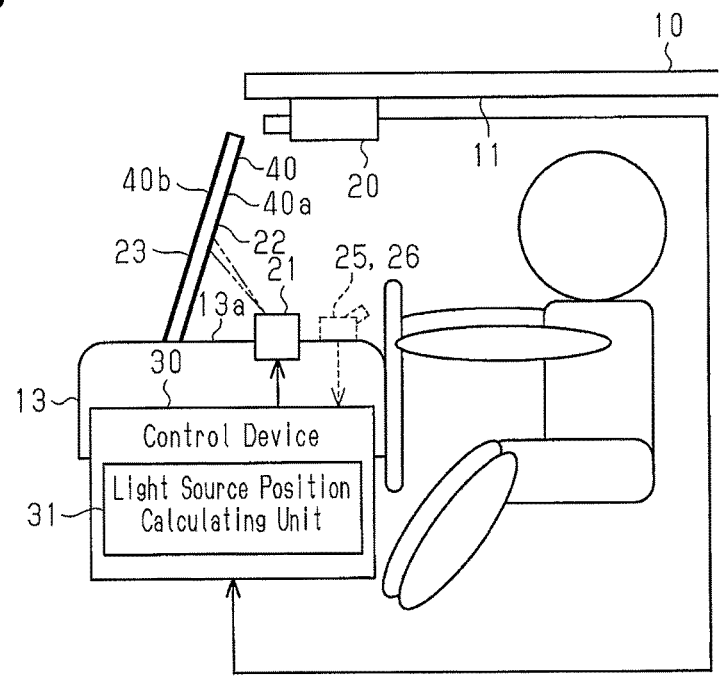
FIG. 7 is a side view showing the arrangement of a light reactive member according to another modification.

As shown in FIG. 7, for example, the transparent plate 40 itself may also function as the windshield.

In each of the above embodiments, the light shielding sheet 23 is provided on the outer surfaces 12b, 40b of the windshield 12 and the transparent plate 40. However, if the windshield 12 and the transparent plate 40 have the function to block light having the specific frequency in advance, the light shielding sheet may be omitted. For example, if a windshield or a transparent plate such as a UV reduction glass is used in a case in which the light having the specific frequency is ultraviolet (UV) light, the light shielding sheet may be omitted, and glare of sunlight in the driver's eyes is still expected to be reduced. In other words, the apparatus may have any structure if it is basically configured with a light source detector, which detects a light source existing outside a vehicle from the vehicle, a light reactive member, which is arranged in front of the driver driving the vehicle in a planar form and changes the color in response to light having a specific frequency, a light source position calculating unit, which calculates the light source position on the surface of the light reactive member based on the output of the light source detector, and a light emitter, which emits light having the specific frequency from the inside of the vehicle to the light reactive member in accordance with the calculated light source position.

In the above described embodiments, the light source detector 20 is secured to the ceiling 11 of the vehicle 10. However, the light source detector 20 may be secured to the interior of the vehicle 10 other than the ceiling 11 of the vehicle 10 if the image of a light source ahead of the vehicle 10 can be taken. The light source detector 20 may be secured to the outside of the vehicle 10 if the image of a light source ahead of the vehicle 10 can be taken.

Each of the above embodiments illustrates a case in which the moving vehicle is an automobile. However, the moving vehicle may be a ship or an aircraft. Even if the above-mentioned anti-glare apparatus is installed in a moving vehicle such as a ship or an aircraft, glare of light that enters from the front of the moving vehicle is effectively reduced.

The invention claimed is:

1. An anti-glare apparatus for reducing a glare of light emitted outside of a moving vehicle, the anti-glare apparatus comprising:
    a light source detector configured to detect a light source that exists outside the moving vehicle;
    a light reactive member having a planar shape, the light reactive member being located in front of a driver that is operating the moving vehicle, and being configured to change color in response to light having a specific frequency;
    a control device configured to calculate a position of the light source on a surface of the light reactive member, based on output of the light source detector; and
    a light emitter configured to emit light having the specific frequency inside the moving vehicle from the light emitter to the light reactive member, based on the light source position calculated by the control device, wherein
    the light reactive member changes color in response to the specific frequency of the light emitted from the light emitter, such that a glare resulting from the light source is reduced.

2. The anti-glare apparatus according to claim 1, wherein the light reactive member is a light reactive sheet located on an inner surface of a windshield of the moving vehicle.

3. The anti-glare apparatus according to claim 2, further comprising a light shielding sheet located on an outer surface of the windshield, the light shielding sheet being configured to block the light emitted from the light emitter inside the moving vehicle having the specific frequency.

4. The anti-glare apparatus according to claim 1, further comprising a face orientation detector configured to detect a face orientation of a face of the driver operating the moving vehicle, wherein
    the control device is further configured to:
    calculate a driver's field of view based upon the face orientation detected by the face orientation detector; and
    determine that the light source position is a position of the light source located within the driver's field of view.

5. The anti-glare apparatus according to claim 1, further comprising a line-of-sight detector configured to detect a line of sight from a position of a pupil of an eye of the driver operating the moving vehicle, wherein
    the control device is further configured to determine that the light source position to be calculated is a position of the light source located within the line of sight of the driver.

6. The anti-glare apparatus according to claim 4, wherein the control device is configured to determine a displacement of the face orientation of the driver based upon a reference position in a horizontal direction and a vertical direction.

7. The anti-glare apparatus according to claim 1, wherein the light source detector is attached to a ceiling of the moving vehicle.

8. The anti-glare apparatus according to claim 1, wherein the moving vehicle is at least one moving vehicle selected from a group consisting of the following: (1) an automobile; (2) a ship; or (3) an aircraft.

9. A method for reducing a glare of light emitted outside of a moving vehicle, the method comprising:
    detecting a light source that exists outside the moving vehicle;
    calculating a position of the light source on a surface of a light reactive member located in front of a driver that is operating the moving vehicle; and
    emitting light having a specific frequency inside the moving vehicle to the light reactive member, based on the light source position calculated, wherein
    the light reactive member changes color in response to the specific frequency of an emitted light, such that a glare resulting from the light source is reduced.

* * * * *